(12) United States Patent
Ishikawa

(10) Patent No.: US 6,687,434 B2
(45) Date of Patent: Feb. 3, 2004

(54) OPTICAL ELEMENT HAVING INCLINED SURFACE

(75) Inventor: Masatake Ishikawa, Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 51 days.

(21) Appl. No.: 10/027,258

(22) Filed: Dec. 19, 2001

(65) Prior Publication Data

US 2002/0110324 A1 Aug. 15, 2002

(30) Foreign Application Priority Data

Dec. 27, 2000 (JP) ........................................ 2000-398571

(51) Int. Cl.$^7$ .............................. G02B 6/32; G02B 9/00
(52) U.S. Cl. .............................. 385/34; 385/31; 385/88; 385/92; 385/93; 359/652
(58) Field of Search ............................... 385/33, 34, 31, 385/88, 92, 93; 359/652, 653, 654, 793, 796

(56) References Cited

U.S. PATENT DOCUMENTS

| | | | | |
|---|---|---|---|---|
| 4,895,433 A | * | 1/1990 | Takahashi et al. ........... | 359/654 |
| 5,074,682 A | * | 12/1991 | Uno et al. ................... | 385/33 |
| 5,172,271 A | * | 12/1992 | Sinclair ...................... | 385/34 |
| 5,221,839 A | * | 6/1993 | Braun ......................... | 385/34 |
| 5,757,993 A | * | 5/1998 | Abe ............................. | 385/34 |
| 6,055,112 A | * | 4/2000 | Campbell-Miller et al. .. | 359/652 |
| 6,253,007 B1 | * | 6/2001 | Laughlin ...................... | 385/34 |
| 6,263,133 B1 | * | 7/2001 | Hamm ........................ | 385/34 |
| 6,408,115 B1 | * | 6/2002 | McIntyre ..................... | 385/34 |
| 6,445,939 B1 | * | 9/2002 | Swanson et al. ............. | 385/34 |
| 2002/0094162 A1 | * | 7/2002 | Li et al. ....................... | 385/34 |
| 2002/0159693 A1 | * | 10/2002 | Wolak et al. ................. | 385/33 |

OTHER PUBLICATIONS

"SELFOC Product Guide", Sep. 1993, NSG Europe XP002190689.

* cited by examiner

*Primary Examiner*—Michael P. Stafira
*Assistant Examiner*—Juan D Valentin
(74) *Attorney, Agent, or Firm*—Marsh Fischmann & Breyfogle LLP

(57) ABSTRACT

A rod lens for an optical communication module is not easily damaged. An input side end surface of the rod lens has an inclined surface. The inclined surface is inclined by a predetermined angle with respect to a central axis of the rod lens to reduce the reflection loss. A flat contact surface, which is perpendicular to the central axis, is formed on the distal end of the rod lens. By simply arranging two of the rod lenses to contact each other, the rod lenses are optically coupled in the optimum manner without being damaged.

10 Claims, 2 Drawing Sheets

OPTICAL ELEMENT HAVING INCLINED SURFACE

BACKGROUND OF THE INVENTION

The present invention relates to an optical element, such as a gradient-index rod-lens and a capillary. More particularly, the present invention pertains to an optical element having at least one end surface that is inclined with respect to a central axis of the rod lens or the capillary.

A typical gradient-index rod-lens converts light that is sent from a light source, such as a laser diode and a light emitting diode (LED), to a parallel light or converges light that is received through an optical fiber at a predetermined position. To transmit light from one optical fiber to another, two rod lenses are arranged to contact each other Alternatively, a filter, which has desired optical characteristics, is placed between two rod lenses. The lens length of the rod lens is determined according to the intended purpose of the rod lens. For example, the lens length of the rod lens is set in accordance with the distance between the output end of the optical fiber and the rod lens or the distance between the two rod lenses such that the coupling loss is minimized.

FIG. 6 illustrates conventional rod lenses 60, 61 used in an optical communication module. The rod lens 60 on the left side has an output side end surface 60a, which is inclined with respect to a central axis C1 of the rod lens 60. The rod lens 61 on the right side has an input side end surface 61a, which is inclined with respect to a central axis C2 of the rod lens 61.

An optical fiber 64 is held by a capillary 63 and an optical fiber 66 is held by a capillary 65. A filter 62 is placed between a distal end portion 60b of the rod lens 60 and a distal end portion 61b of the rod lens 61. The rod lens 60 converts light that is emitted from the output end of the optical fiber 64 to a parallel light. The parallel light is transmitted through the filter 62 and enters the rod lens 61. The rod lens 61 converges the parallel light at the input end of the optical fiber 66. The converged light travels through the optical fiber 66 and is sent to another optical element. The two rod lenses 60, 61 optically couple the two optical fibers 64, 66.

The lens length Z of the rod lens 60 is the length of the central axis C1 between both end surfaces. The lens length Z of the rod lens 61 is the length of the central axis C2 between both end surfaces. The distance L between the two rod lenses 60, 61 is the distance between the output side end surface 60b and the input side end surface 61a along the central axes C1, C2.

The distal end portions 60b, 61b of the conventional rod lenses 60, 61 are sharp and easily damaged. For example, the distal end portions 60b, 61b could get chipped when placing the filter 62 between the distal end portions 60b, 61b, or when the distal end portions 60b, 61b are arranged to contact each other. If the distal end portions 60b, 61b get chipped, the distance L changes. Therefore, the lens length Z, which is optimized in accordance with the distance L before the distal end portions 60b, 61b get chipped, is not optimum. Thus, the optical communication module that uses the rod lenses 60, 61 having chipped distal end portions 60b, 61b has great coupling loss. Accordingly, the optical fibers 64, 66 are not optically coupled in the optimum manner. Also, when inserting the rod lenses 60, 61 into a holder such as a cylindrical sleeve, the sharp distal end portions 60b, 61b could contact the holder and get chipped. In this case, the optical module is defective. Similar problem occurs when the end surface of each capillary 63, 65 is inclined. If the sharp distal end portions of the rod lenses 60, 61 or the capillaries 63, 65 get chipped, the chipped pieces could further increase the coupling loss.

SUMMARY OF THE INVENTION

The objective of the present invention is to provide an optical element for an optical communication module that is not easily damaged, improves the defect rate, and reduces the coupling loss The objective of the present invention is to provide an optical element for an optical communication module that minimizes the coupling loss without performing alignment during the assembly of various types of optical modules.

To achieve the foregoing objective, the present invention provides an optical element. The optical element includes a first end surface and a second end surface. At least one of the first end surface and the second end surface includes an inclined surface, which is inclined by a predetermined angle with respect to a central axis of the optical element, and a distal end surface, which is adjacent to the inclined surface.

The present invention also provides a cylindrical optical element. The cylindrical optical element includes a first end surface, a second end surface, and an outer circumferential surface. The first end surface intersects a central axis of the optical element. The second end surface intersects the central axis. The outer circumferential surface extends along the central axis. At least one of the first end surface and the second end surface includes an inclined surface, which is inclined by a predetermined angle with respect to the central axis of the optical element, and a contact surface, which is adjacent to the inclined surface and is perpendicular to the central axis.

Other aspects and advantages of the invention will become apparent from the following description, taken in conjunction with the accompanying drawings illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An optical element having an inclined surface according to a preferred embodiment of the present invention will now be described with reference to FIGS. 1 to 4.

In this specification, a term "optical element" includes a gradient-index rod-lens, a capillary, which holds an optical fiber, and an optical member such as an optical crystal used for, for example, an optical isolator. Also, in this specification, a term "effective diameter of a rod lens" refers to the maximum diameter of a lens that provides an optical aberration that is less than or equal to a predetermined value.

Figure 1:
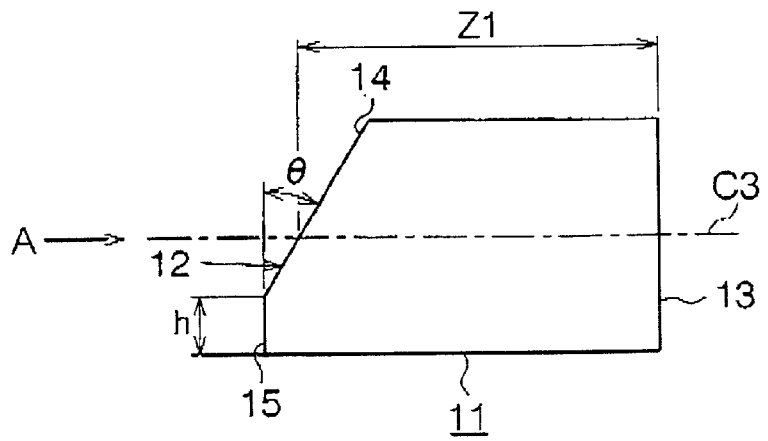
FIG. 1 is a side view illustrating a rod lens according to the preferred embodiment of the present invention.
Figure 2:
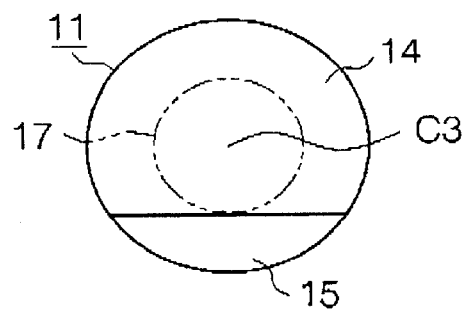
FIG. 2 is a front view illustrating the rod lens shown in FIG. 1.

A gradient-index rod-lens 11 according to the preferred embodiment of the present invention will now be described with reference to FIGS. 1 and 2. FIG. 2 is a view looking at the rod lens 11 shown in FIG. 1 from a direction indicated by an arrow A.

The rod lens 11 is a cylindrical glass having a predetermined gradient index. The rod lens 11 has an input side end surface 12 and an output side end surface 13. The output side end surface 13 is a flat surface that is perpendicular to a central axis C3 of the rod lens 11. On the other hand, the input side end surface 12 includes an inclined surface 14 and a contact surface 15. The inclined surface 14 is inclined by a predetermined inclination angle θ with respect to the central axis C3. The contact surface 15 is a distal end portion that is adjacent to the inclined surface 14. The contact surface 15 is preferably a flat surface that is perpendicular to the central axis C3. In other words, the outer circumferential surface of the rod lens 11 and the contact surface 15 preferably form an angle of at least go degrees in relation to each other.

The lens length (light path length) Z1 of the rod lens it is determined in accordance with the gradient index characteristics (√A) of the rod lens 11 and the distance L (see FIG. 3) required by an application (an optical communication module) in which the rod lens 11 is used. The contact surface 15 and the inclined surface 14 are formed on the input side end surface 12 of the rod lens 11 such that the rod lens 11 has the determined lens length Z1. More specifically, the dimension h of the contact surface 15, which is perpendicular to the central axis C3, is determined in accordance with the lens length Z1 and the distance L. The inclination angle θ of the inclined surface 14 is determined such that the distal end portion of the input side end surface 12 has the contact surface 15, which has the dimension h. The contact surface 15 is preferably formed outside an effective diameter area 17 of the rod lens 11.

Figure 3:
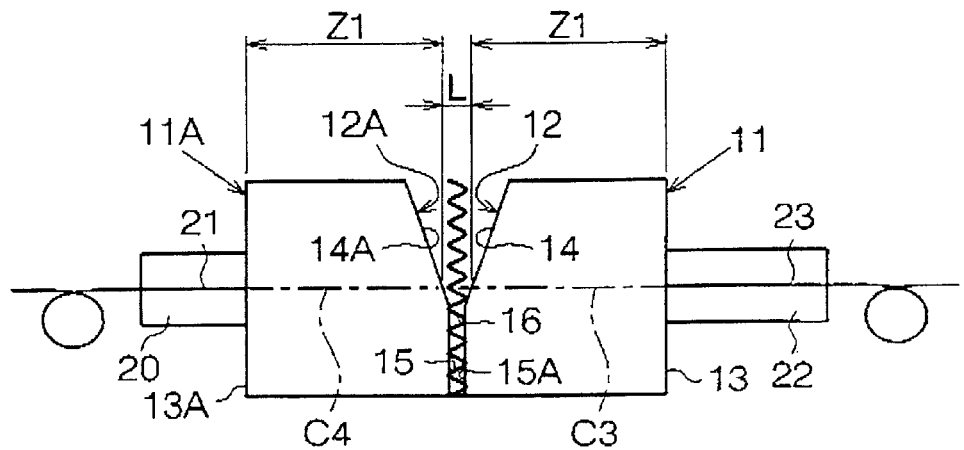
FIG. 3 is a side view illustrating two rod lenses shown in FIG. 1 that are coupled to each other.

FIG. 3 shows the rod lens 11 used in an optical communication module. The optical communication module includes the rod lens 11 and a rod lens 11A, which is a mirror image of the rod lens 11 The rod lens 11A has the same structure as the rod lens 11 The rod lens 11 and the rod lens 11A are coaxial. The input side end surface 13A of the rod lens 11A is a flat surface that is perpendicular to the central axis C4 of the rod lens 11A. On the other hand, the output side end surface 12A of the rod lens 11A includes the inclined surface 14A and the contact surface 15A. The inclined surface 14A is inclined by the predetermined inclination angle θ with respect to the central axis C4. The contact surface 15A is perpendicular to the central axis C4.

A filter 16 is located between the contact surface 15A of the rod lens 11A and the contact surface 15 of the rod lens 11. A capillary 20, which holds an optical fiber 21, is secured to the input side end surface 13A of the rod lens 11A. A capillary 22, which holds an optical fiber 23, is secured to the output side end surface 13 of the rod lens 11. The rod lens 11A converts the light that is emitted from the optical fiber 21 to a parallel light and emits the parallel light to the filter 16. The light that is transmitted through the 10 filter 16 is converged by the rod lens 11. The converged light enters the optical fiber 23 and is sent to another optical element, which is not shown. As described above, the two rod lenses 11A, 11 optically couple the two optical fibers 21, 23.

The rod lenses 11A, 11 according to the preferred embodiment provides the following advantages.

(1) Each contact surface 15A, 15 is formed on the distal end of the end surface 12A, 12 of the corresponding rod lens 11A, 11. Each contact surface 15A, 15 is adjacent to the corresponding inclined surface 14A, 14 and is perpendicular to the corresponding central axis C3, C4. Therefore, the distal end of each rod lens 11A, 11 is prevented from getting chipped when the filter 16 is placed between the contact surfaces 15A, 15. Also, the distal end of each rod lens 11A, 11 is prevented from getting chipped when the two contact surfaces 15A, 15 are arranged to directly contact each other. Furthermore, when the rod lenses 11A, 11 are being inserted into cylindrical holders, the distal end of each rod lens 11A, 11 is prevented from getting chipped even if the distal end 11A, 11 of each rod lens contacts the corresponding holder. Since the distal end of each rod lens 11A, 11 is prevented from getting chipped, the two optical fibers 21, 23 are optically coupled in the optimum manner. Therefore, the rod lenses 11A, 11 are prevented from being damaged when manufacturing the optical communication module using the rod lenses 11A, 11. The rod lenses 11A, 11 also have improved defect rate and reduced coupling loss.

(2) Each contact surface 15A, 15 is accurately formed at a predetermined position along the length of the corresponding rod lens 11A, 11. Therefore, when manufacturing various types of optical modules, the two rod lenses 11A, 11 are optically coupled in the optimum manner by only placing an element such as the filter 16 between two contact surfaces 15A, 15. Similarly, the two rod lenses 11A, 11 are optically coupled in the optimum manner by only arranging the two contact surfaces 15A, 15 to contact each other. Therefore, when manufacturing various types of optical modules using the rod lens 11 (11A) having the contact surface 15 (15A), the coupling loss is minimized without performing alignment of the rod lens 11 (11A) with respect to the other optical element 11A (11).

(3) The contact surface 15 is formed outside the effective diameter area 17 of the rod lens 11. Therefore, the optical performance of the rod lens 11 is maintained. The size of the contact surface 15 is chanced in accordance with the focal distance of the rod lens 11 if the contact surface 15 is outside the effective diameter area 17 of the rod lens 11. This adds to the flexibility of the design.

Figure 4:
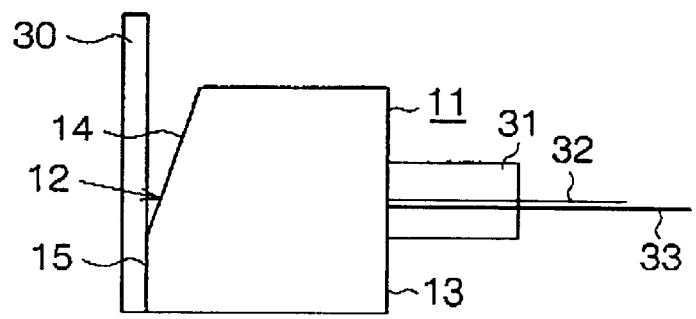
FIG. 4 is a side view illustrating the rod lens shown in FIG. 1 used in different optical communication module.

(4) The rod lens 11 may be used as shown in FIG. 4. In the case of FIG. 4, a reflection surface of a mirror 30 abuts against the contact surface 15 of the rod lens 11. The capillary 31 holds two optical fibers 32, 33. Light is emitted from the output end of the optical fiber 32 and enters the rod lens 11. The rod lens 11 converts the light to a parallel light and emits to the mirror 30. The mirror 30 reflects the light and the reflected light is converged by the rod lens 11. The converged light then enters the input end of the optical fiber 33.

In this case, the advantages (1) and (2) are also provided. The optical fibers 32, 33 are optically coupled in the optimum manner by only arranging the reflection surface of the mirror 30 to contact the contact surface 15 of the rod lens 11. Therefore, the coupling loss is minimized without performing alignment of the rod lens 11 with respect to the mirror 30.

It should be apparent to those skilled in the art that the present invention may be embodied in many other specific forms without departing from the spirit or scope of the invention. Particularly, it should be understood that the invention may be embodied in the following forms.

In the preferred embodiment, the present invention is applied to the gradient-index rod-lens 11, 11A. However, the present invention may be applied to any one of the capillaries 20, 22, 31, which hold the optical fibers 21, 23, 32, 33. That is, the inclined surface and the distal end, which is adjacent to the inclined surface and has no sharp edge, may be formed on at least one of the ends of the capillary 20, 22, 31. The distal end is preferably a Flat surface that is perpendicular to the optical axis of the capillary 20, 22, 31 as the contact surface 15. In this case, the distal end of the capillary 20, 22, 31 does not easily get chipped even when the distal end contacts the cylindrical holder such as the sleeve. This improves the defect rate during manufacturing of various types of optical modules.

Figure 5:
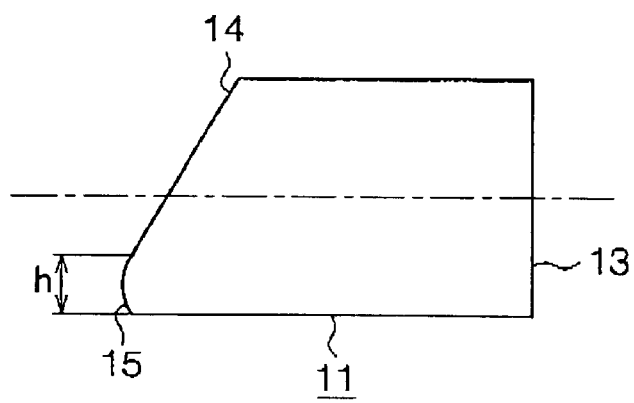
FIG. 5 is a side view illustrating another example of a rod lens according to the present invention.
Figure 6:
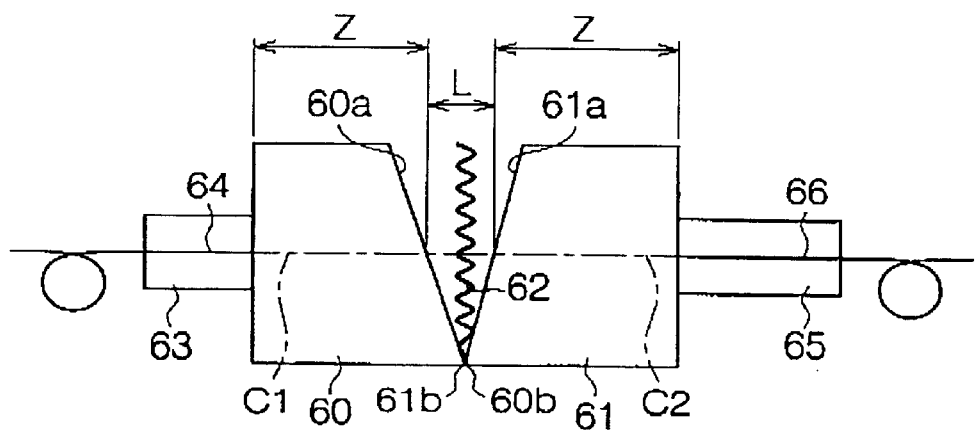
FIG. 6 is a side view illustrating two conventional rod lenses that are coupled to each other.

As shown in FIG. 5, the contact surface 15 may be curved.

The inclined surface 14 and the contact surface 15 may be formed on both end surfaces 12, 13 of the rod lens 11.

In FIG. 3, an inclined surface may be formed on the input side end surface 13A of the left side rod lens 11A. Then, an inclined surface, which corresponds to the inclined surface of the input side end surface 13A, may be formed on the end surface of the left side capillary 20. In this case, the inclined surface of the rod lens 11A and the inclined surface of the capillary 20 are located with a predetermined space in between. The right side capillary 22 and the right side rod lens 11 may be formed in the same manner.

The rod lens 11 need not be cylindrical. For example, the rod lens 11 may be square.

Therefore, the present examples and embodiments are to be considered as illustrative and not restrictive and the invention is not to be limited to the details given herein, but may be modified within the scope and equivalence of the appended claims.

What is claimed is:

1. An optical module comprising:

a first optical element having a planar surface; and a second optical element optically coupled with the first optical element and having a first end and a second end, wherein the second optical element includes:

an inclined surface formed in at least one of the first end and the second end and inclined by a predetermined angle with respect to a central axis of the second optical element; and a contact surface contacted against the planar surface of the first optical element, wherein the contact surface is perpendicular to the central axis and is adjacent to the inclined surface.

2. The optical module according to claim 1, wherein the outer surface of the second optical element and the contact surface form an angle of at least 90 degrees in relation to each other.

3. The optical module according to claim 1, wherein the contact surface is planar.

4. The optical module according to claim 1, wherein the contact surface is formed with a convex shape.

5. The optical module according to claim 1, wherein the second optical element is a gradient-index rod-lens having an input end to which light is inputted and an output end from which the light is outputted, and wherein the inclined surface and the contact surface are formed in one of the input end and the output end.

6. The optical module according to claim 5, wherein the contact surface is formed outside the effective diameter area of the rod lens.

7. The optical module according to claim 1, wherein the second optical element is a capillary that holds at least one optical fiber.

8. The optical module according to claim 1, wherein the first optical element is a planar mirror and the second optical element is a rod-lens.

9. The optical module according to claim 1, wherein the first optical element is a filter and the second optical element is a rod-lens.

10. The optical module according to claim 1, wherein the second optical element is a pair of rod-lenses and the first optical element is a filter arranged between the contact surfaces of the rod-lens.

* * * * *